(12) United States Patent
Bethancourt et al.

(10) Patent No.: US 9,967,153 B2
(45) Date of Patent: May 8, 2018

(54) SELF-DEFINING CONFIGURATION APPARATUS, METHODS, AND SYSTEMS

(71) Applicant: Halliburton Energy Services, Inc., Houston, TX (US)

(72) Inventors: William David Bethancourt, Houghton, MI (US); Ranganathan Sridharan, Kingwood, TX (US); James Lin, Spring, TX (US); Andre Krisna, Houston, TX (US); Christopher Golla, Kingwood, TX (US); Bhargav Patel, Houston, TX (US); Svetozar Simeonov, Houston, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 568 days.

(21) Appl. No.: 14/424,200

(22) PCT Filed: Oct. 19, 2012

(86) PCT No.: PCT/US2012/061073
§ 371 (c)(1),
(2) Date: Feb. 26, 2015

(87) PCT Pub. No.: WO2014/062194
PCT Pub. Date: Apr. 24, 2014

(65) Prior Publication Data
US 2015/0304172 A1 Oct. 22, 2015

(51) Int. Cl.
*G06F 3/00* (2006.01)
*H04L 12/24* (2006.01)
(Continued)

(52) U.S. Cl.
CPC .......... *H04L 41/22* (2013.01); *G06F 3/04842* (2013.01); *G06F 3/04847* (2013.01); *G06F 8/665* (2013.01); *G06F 9/44505* (2013.01)

(58) Field of Classification Search
CPC combination set(s) only.
See application file for complete search history.

(56) References Cited

U.S. PATENT DOCUMENTS

| 5,419,405 A | 5/1995 | Patton et al. |
| 5,812,068 A | 9/1998 | Wisler et al. |

(Continued)

FOREIGN PATENT DOCUMENTS

WO WO-2014062194 A1 4/2014

OTHER PUBLICATIONS

"Australian Application Serial No. 2012392555, First Examiner Report dated Feb. 1, 2016", 3 pgs.
"Australian Application Serial No. 2012392555, Response filed Jul. 4, 2016 to First Examiner Report dated Feb. 1, 2016", 19 pgs.
"Canadian Application Serial No. 2,887,306, Office Action dated Jun. 30, 2016", 4 pgs.

(Continued)

*Primary Examiner* — Hien L Duong
(74) *Attorney, Agent, or Firm* — Haynes and Boone, LLP (57) ABSTRACT

In some embodiments, an apparatus and a system, as well as a method and an article, may operate to retrieve a parsing instructions file and a binary configuration file stored in a housing, parse the binary configuration file according to the parsing instructions file to determine configuration information, display at least some of the configuration information as part of a graphical user interface, receive a selection of some of the configuration information and corresponding changed parameter values of the configuration information, transform the binary configuration file into a transformed version of the binary configuration file, and transmit the transformed version of the binary configuration file to the housing as a replacement for the binary configuration file. Additional apparatus, systems, and methods are described.

19 Claims, 6 Drawing Sheets

(51) Int. Cl.
*G06F 9/445* (2018.01)
*G06F 3/0484* (2013.01)

(56) References Cited

U.S. PATENT DOCUMENTS

| | | | |
|---|---|---|---|
| 5,959,547 | A | 9/1999 | Tubel et al. |
| 7,155,254 | B2 | 12/2006 | Pinder |
| 7,475,235 | B1 | 1/2009 | Bernardy et al. |
| 7,519,914 | B2* | 4/2009 | Fernandez ............ G06F 9/4443 715/762 |
| 2003/0182463 | A1 | 9/2003 | Valk |
| 2007/0038376 | A1* | 2/2007 | Beck ....................... G06F 17/50 702/6 |
| 2009/0182472 | A1* | 7/2009 | Singh ...................... E21B 47/12 701/50 |
| 2010/0085210 | A1 | 4/2010 | Bonavides et al. |
| 2010/0267376 | A1 | 10/2010 | Saari et al. |
| 2012/0194320 | A1 | 8/2012 | Yeakley et al. |

OTHER PUBLICATIONS

"European Application Serial No. 12886692.8, Extended European Search Report dated Jun. 8, 2016", 6 pgs.

"European Application Serial No. 12886692.8, Office Action dated Jun. 16, 2015", 3 pgs.

"European Application Serial No. 12886692.8, Response filed Dec. 16, 2015 to Office Action dated Jun. 16, 2015", 9 pgs.

"Malaysian Application Serial No. PI201500090, Preliminary Examination—Adverse Formalities Report dated May 21, 2015", 2 pgs.

Extended Search Report for European Patent Application No. 12886692, dated Jun. 8, 2016, 6 pages.

"International Application Serial No. PCT/US2012/061073, International Preliminary Report on Patentability dated Nov. 21, 2014", 6 pgs.

"International Application Serial No. PCT/US2012/061073, International Search Report dated Dec. 17, 2012", 2 pgs.

"International Application Serial No. PCT/US2012/061073, Written Opinion dated Dec. 17, 2012", 5 pgs.

* cited by examiner

SELF-DEFINING CONFIGURATION APPARATUS, METHODS, AND SYSTEMS

PRIORITY APPLICATIONS

This application is a U.S. National Stage Filing under 35 U.S.C. 371 from International Application No. PCT/US2012/061073, filed on 19 Oct. 2012, and published as WO 2014/062194 A1 on 24 Apr. 2014, which applications and publication are incorporated herein by reference in their entirety.

BACKGROUND

Understanding the structure and properties of geological formations can reduce the cost of drilling wells for oil and gas exploration. Measurements made in a borehole (i.e., down hole measurements) are typically performed to attain this understanding by identifying the composition and distribution of material that surrounds the measurement device down hole.

Prior to operating measurement instruments attached to a down hole tool, a field engineer configures the tool for operation. Some devices in the tool react to simple instructions, such as specifying a sample rate and initialization time. Others are more complex, with hundreds of input parameters to arrange. Not all of these input parameters are configurable at the job site.

Current methods of configuration involve modifying the firmware embedded in the tool, as well as corresponding surface system software, whenever a change is made to certain tool/instrument configuration parameters. Thus, to make some changes, such as adding new parameters that correspond to a newly-available feature, perhaps due to the incorporation of an improved instrument into the tool, software on the surface and in the tool is modified, tested, and released. These new versions are then synchronized as a new release, and problems arising when the new firmware is operated in conjunction with old surface software, and vice versa, are mitigated with additional programming. Surface software version management also creates additional expense and compatibility issues.

DETAILED DESCRIPTION

To address some of the challenges described above, as well as others, apparatus, systems, and methods are described herein that provide information in the down hole tool housing to enable re-configuration of the software embedded in the tool, without making changes to the surface software. The information in the down hole tool housing is stored in a self-defining data format.

A second device (e.g., a surface computer) may be used to revise the configuration information stored in the embedded device (such as a processor or memory in a down hole tool) according to a set of rules. In this way, changes can be made to an embedded device's firmware without having to modify the corresponding surface computer software.

In some embodiments of the invention, this kind of operation is brought about by using a binary configuration file that is stored in the down hole tool housing, along with a parsing instructions file. The parsing instructions file contains enough information for software at the surface to parse the binary configuration file. The parsing instructions file may be written in a number of languages, such as the eXtensible markup language (XML), to support common simple variable types, arrays, and custom variable types.

The surface computer software accesses the binary configuration file and the parsing instructions file to extract tool/instrument parameter values from the binary configuration file, which can then be displayed to the tool operator. The operator may change some of the displayed values if desired.

When changes are made, the surface computer software creates a modified version of the binary configuration file (using the information in the parsing instructions file), to include the changed parameter values. When the modified binary configuration file is stored in a memory in the down hole housing, the new configuration information, along with whatever default parameter values were specified in the original version of the binary configuration file, is used to configure the tool for operation.

In some embodiments, the display of parameters to the operator is provided by a graphical user interface (GUI). GUI components can be dynamically generated, based on information in the parsing instructions file.

To provide a more consistent use of terminology throughout this document, some specific terms and phrases are used. For example, an object, such as a file, has a "self-defining format" or a "self-defining data format" when the object is formatted according to information that makes up a part of the object. That is, the object itself contains an inbuilt description of its own data structure.

One example of this type of format includes the Self-Defining Text Archive and Retrieval (STAR) file format, which forms part of STAR files that are used for the archiving and electronic publication of text and numerical data. Those that desire to learn more about this format are encouraged to consult "The STAR File: detailed specifications" by Sydney R. Hall, et al., J. Chem. Inf. Comput. Sci., pp. 505-508, 1994. Another example that is known to those of ordinary skill in the art can be observed by referring to "SDDF: The Pablo Self-describing Data Format" by R. A. Aydt, Tech. Rep., Department of Computer Science, University of Illinois, April 1994. Further examples exist, and any of these, or similar schemes, may be used to realize various embodiments of the invention.

Figure 1:
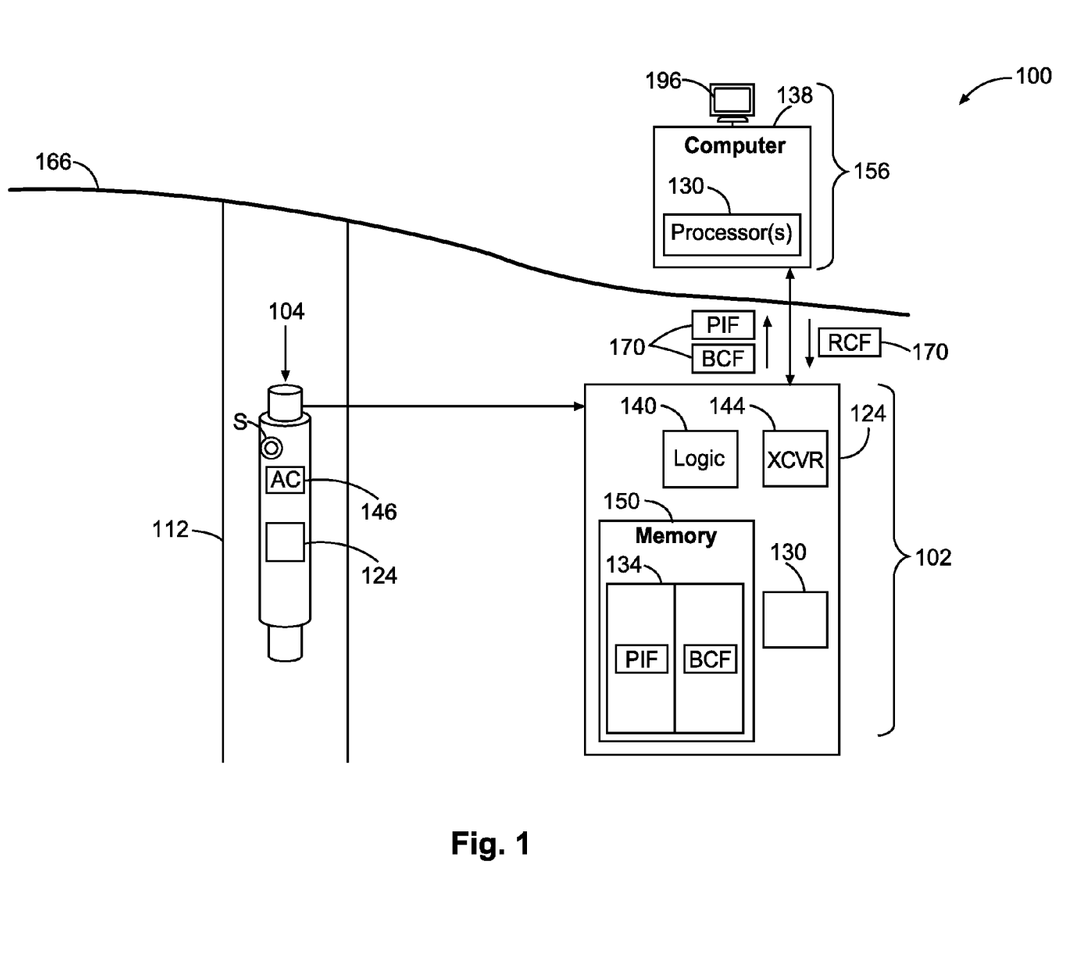
FIG. 1 is a block diagram of apparatus and systems according to various embodiments of the invention.

The phrase "embedded device", as used herein, means any device, such as a processor, an instrument, or circuit component (e.g., the data acquisition system 124, processor 130, logic 140, transceiver 144, or memory 150) that can be used to store a binary configuration file or a parsing instructions file. In many embodiments, a housing is used to enclose one or more embedded devices, to protect them from the down hole environment. A more detailed description of mechanisms for self-defining configuration, described above and used in various embodiments, will now be provided.

FIG. 1 is a block diagram of apparatus 102 and systems 100 according to various embodiments of the invention. In some embodiments, a system 100 includes a housing 104. The housing 104 might take the form of a wireline tool body, or a down hole tool. Processor(s) 130 within the system 100 may be located at the surface 166, as part of a surface logging facility 156, and/or in a data acquisition system 124, which may be above or below the Earth's surface 166 (e.g., attached to and enclosed within the housing 104). Logic 140 can be used to acquire data from the sensors S as signals.

A system 100 may further comprise a data transceiver 144 (e.g., a telemetry transmitter and/or receiver) to transmit data 170 (e.g., a binary configuration file BCF and a parsing instructions file PIF, as well as data acquired from the sensors S) to the surface logging facility 156. The data transceiver 144 may also be used to receive data 170, such as a revised version of the binary configuration file, which may be designated as a revised configuration file RCF.

Acquired data, and files, such as the binary configuration file BCF, the parsing instructions file PIF, and the revised configuration file RCF, as well as other data, can be stored in a memory 150, perhaps as part of a data structure 134, including a database. Any embedded device within the housing 104 may include one or more instances of the memory 150.

The surface computer 138 forming part of the facility 156 can operate to de-serialize (read and understand) the binary configuration file BCF and create a user GUI on the display 196, based on the content of the parsing instructions file PIF, and the values held in the binary configuration file BCF. The surface computer 138 can also operate to accept changes to the tool configuration from an operator, via a user input device (e.g., keyboard and/or mouse). The surface computer 138 can also serialize the information contained in the changes to form a new (revised) binary configuration file, as a revised configuration file RCF. The revised configuration file RCF can be transmitted back to embedded devices attached to the housing 104.

Figure 2:
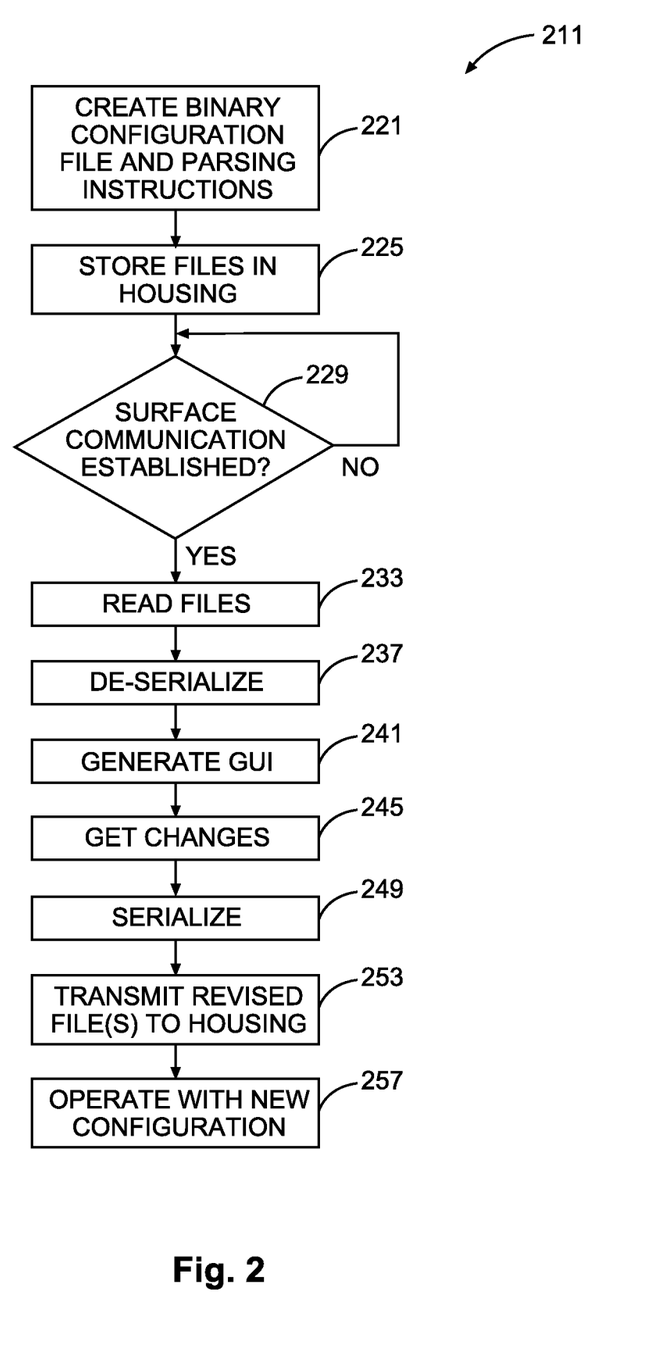
FIG. 2 is a flow chart illustrating several methods according to various embodiments of the invention.

FIG. 2 is a flow chart illustrating several methods 211 according to various embodiments of the invention. These methods 211 can be used to reconfigure a down hole tool without changing the composition of the software used to operate a surface computer. The methods 211 may be applied to a number of configurations of the system 100 and apparatus 102 shown in FIG. 1.

In some embodiments, a method 211 may begin at block 221 with creating a binary structure (e.g., in the C computer language) to store and manipulate embedded device configuration information. The serialization of the C structure is stored on the embedded device as a binary configuration file BCF.

As part of the activity at block 221, a parsing instructions file PIF is also created to provide information for extracting configuration information from the binary configuration file BCF.

The method 211 may go on to block 225 to store the binary configuration file BCF and the parsing instructions file PIF in an embedded device attached to a housing. When this occurs, the housing may be located on the surface, or down hole.

At block 229, a determination is made as to whether communication has been established between at least one embedded device in the housing, and a surface computer. The method 211 includes waiting for communication to be established at block 229, and continues on to block 233 to begin configuration of the tool, by reading the binary configuration file BCF and parsing instructions file PIF once the surface computer establishes communication with the housing (e.g., via an embedded device).

At block 237, the surface computer uses the information in the parsing instructions file PIF to de-serialize the binary configuration file BCF, perhaps creating an in-memory object with the configuration information contained in the binary configuration file BCF.

At block 241, the parsing instructions can be used by the surface computer to dynamically generate a GUI for the operator, listing configuration variable names, options, units, ranges, and other parameters that may be used to configure the operation of an embedded device.

As part of the activity at block 241, the surface computer may operate to seed the GUI with default configuration information, based on the de-serialization of the binary configuration file BCF.

In addition, the parsing instructions file PIF can be used to provide information about many other things, besides parameter values for the current tool configuration. For example, the GUI display can be generated according to the parsing instructions file PIF to designate: (a) limits that have changed when a new release of the embedded firmware is prepared and installed; (b) parameters that may be changed by the operator; (c) collections of parameters that may be changed or added, including sampling methods, or the choice of an algorithm that is used to sample or process raw data from sensors on the housing; and (d) new features that have been added to embedded device firmware, along with ranges of operating parameters for the new features. These are just a few examples of what may be specified in the parsing instructions file PIF.

At block 245, when the operator selects and modifies parameter values in the configuration information presented by the GUI, the surface computer can operate to receive the changed values. These new (revised) values can be used to create a revised configuration file RCF, that will in turn be used to modify the configuration of the associated down hole tool.

In some embodiments, sensors and other components can be added to the housing. The addition can be specified manually, as part of the activity at block 245, or it can be effected automatically, when power is applied to the housing and communications are established between the housing components and the surface computer. In this case, an indication of the addition can be provided by the housing directly to the surface computer—with new configuration options specified via information in the parsing instructions file PIF.

At block 249, the surface computer operates to serialize the modified configuration information, to construct a revised configuration file RCF.

At block 253, the revised configuration file RCF, and perhaps a new parsing instructions file, are transmitted to the embedded device in the housing, where they are stored. The prior binary configuration file BCF is thus replaced with the revised configuration file RCF, which in turn becomes a new version of the binary configuration file BCF.

Subsequently, at block 257, the tool can be operated with a modified configuration, according to the new configuration information provided by the revised configuration file RCF that is stored as a new version of the binary configuration file BCF in the tool.

Thus, referring now to FIGS. 1-2, it can be seen that many embodiments may be realized, including a system 100 that comprises a housing 104 and one or more processors 130, which may be located down hole or at the surface. For example, in some embodiments a system 100 comprises a housing 104 that is used to store the binary configuration file BCF and the parsing instructions file PIF, and a surface computer 138 (e.g., forming part of the facility 156) to receive, process, and restore the binary configuration file BCF and the parsing instructions file PIF as a new version of the binary configuration file and (optionally) a new version of the parsing instructions file, respectively.

In some embodiments, a system 100 comprises a housing 104 and a surface computer 138. The housing 104 may comprise a down hole tool or a wireline tool, and may be used to store a parsing instructions file PIF and a binary configuration file BCF. The surface computer 138 may operate to parse the binary configuration file BCF according to the parsing instructions file PIF, to determine configuration information associated with the binary configuration file BCF. The computer 138 may also operate to display at least some of the configuration information as part of a GUI, and to receive a selection of at least some of the configuration information (forming a subset of the configuration information, such as some of the configuration information displayed as part of the GUI) and corresponding changed values. The computer 138 may further operate to transform the binary configuration file BCF into a transformed version of the binary configuration file (e.g., the revised configuration file RCF) to replace values of the selection with the changed values, and to transmit the transformed version of the binary configuration file to the housing as a replacement for the prior version of the binary configuration file BCF. The transformed version of the binary configuration file BCF can be used to configure operation of the wireline tool or the down hole tool.

In some embodiments, the system may include sensors that operate according to changes in the values of configuration information. Thus, the system 100 may further comprise a sensor S attached to the housing 104, the sensor S to be controlled by a processor 130 in the housing 104 according to the selection (received at the surface computer) and the changed values corresponding to the selection.

In some embodiments, the system may include a transmitter to send the files to the surface. Thus, the system 100 may comprise a transmitter (e.g., as part of the transceiver 144) to transmit the parsing instructions file PIF and the binary configuration file BCF from the housing 104 to the surface computer 138.

In some embodiments, additional components, such as instruments or sensors (e.g., logic 140), can be added to the housing. When power is applied to the additional components, an indication is sent to the surface computer 138, to let the surface computer 138 know that the number of changeable parameters in the configuration information should be increased, to accommodate new parameters that are associated with the additional components. Thus, the system 100 may further comprise an additional component 146 attached to the housing 104, the additional component 146 configured so that when operational power is applied to the housing 104, the additional component 146 is associated with an indication sent to the surface computer 138 that additional parameters associated with the additional component 146 are to be added to the configuration information.

In some embodiments, the parsing instructions file PIF can be stored in a variety of formats, including a self-defining data format. The self-defining data format may be implemented using an XML language that permits the definition of fields, variable types, and the organization of a binary configuration file BCF.

In some embodiments, non-volatile memory is used to store the binary configuration file BCF and parsing instructions file PIF. Thus, a system 100 may further comprise a non-volatile memory 150 disposed within the housing 104, with the memory 150 being used to store the binary configuration file BCF, among other information.

In some embodiments of the system 100, processors 130 may be housed by the housing 104, or within a surface data processing facility 156, or both, depending on where various activities are conducted. Thus, processing during various activities conducted by the system 100 may be conducted both down hole (e.g., in a well 112) and at the surface 166. Additional embodiments may be realized, and thus, some additional examples of systems will now be described.

Figure 3:
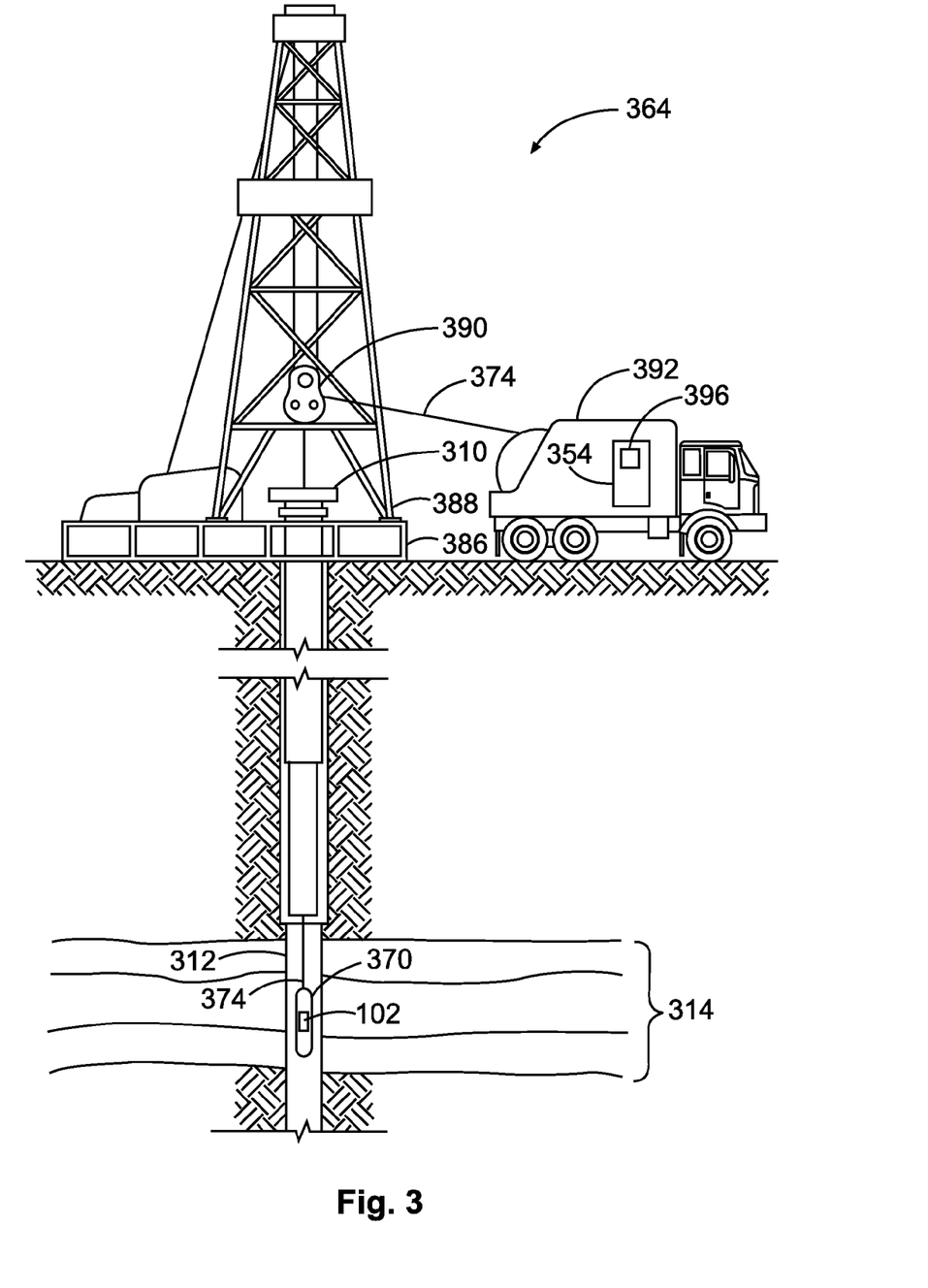
FIG. 3 illustrates a wireline system embodiment of the invention.
Figure 4:
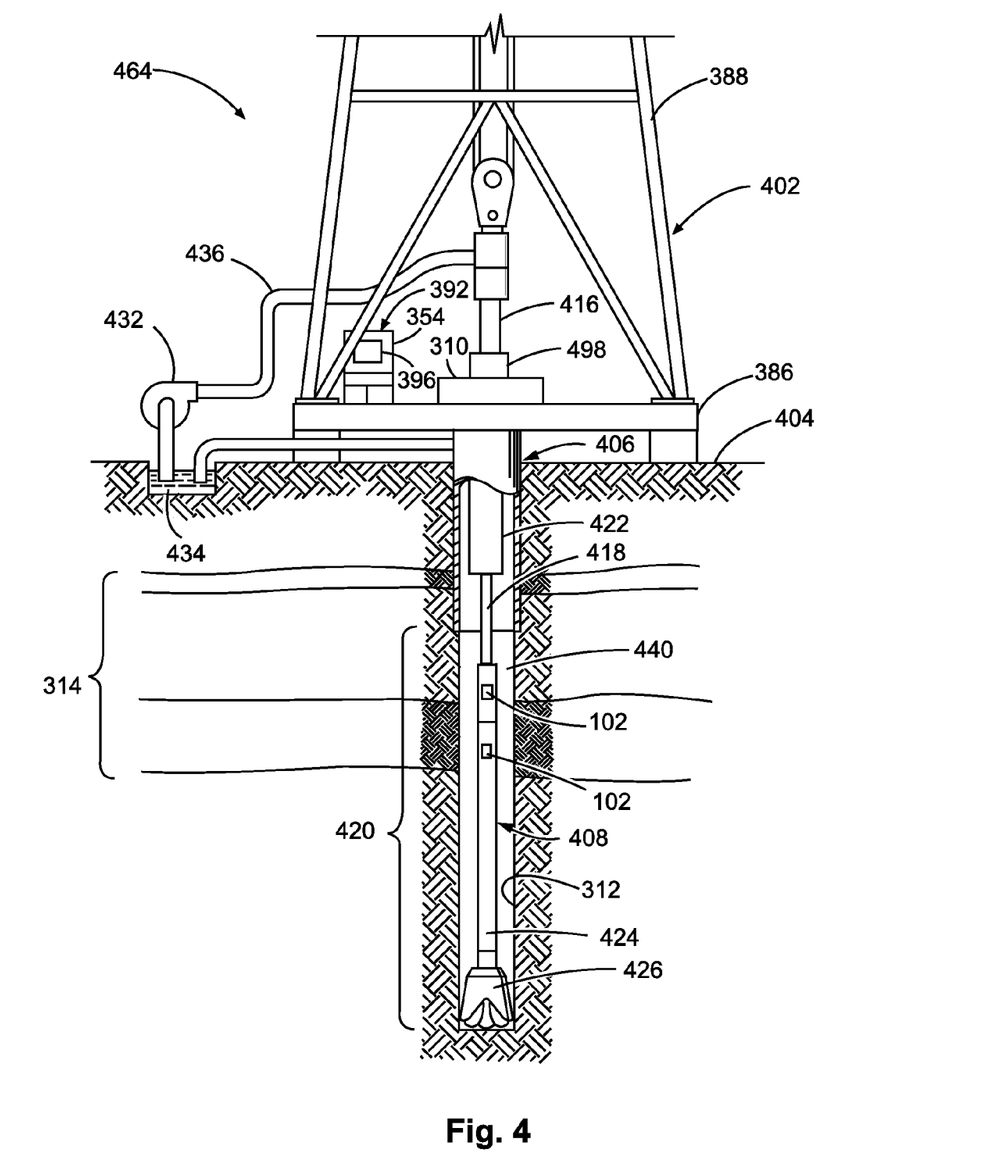
FIG. 4 illustrates a drilling rig system embodiment of the invention.

FIG. 3 illustrates a wireline system 364 embodiment of the invention, and FIG. 4 illustrates a drilling rig system 464 embodiment of the invention. Therefore, the systems 364, 464 may comprise portions of a wireline logging tool body 370 as part of a wireline logging operation, or of a down hole tool 424 as part of a down hole drilling operation. The systems 364 and 464 may include any one or more elements of the system 100 and apparatus 102 shown in FIG. 1.

Thus, FIG. 3 shows a well during wireline logging operations. In this case, a drilling platform 386 is equipped with a derrick 388 that supports a hoist 390.

Drilling oil and gas wells is commonly carried out using a string of drill pipes connected together so as to form a drilling string that is lowered through a rotary table 310 into a wellbore or borehole 312. Here it is assumed that the drilling string has been temporarily removed from the borehole 312 to allow a wireline logging tool body 370, such as a probe or sonde, to be lowered by wireline or logging cable 374 into the borehole 312. Typically, the wireline logging tool body 370 is lowered to the bottom of the region of interest and subsequently pulled upward at a substantially constant speed.

During the upward trip, at a series of depths, various instruments included in the tool body 370 may be used to perform measurements (e.g., made by portions of the apparatus 102 shown in FIG. 1) on the subsurface geological formations 314 adjacent the borehole 312 (and the tool body 370). The borehole 312 may represent one or more offset wells, or a target well.

The measurement data can be communicated to a surface logging facility 392 for processing, analysis, and/or storage. The logging facility 392 may be provided with electronic equipment for various types of signal processing, which may be implemented by any one or more of the components of the apparatus 102 or system 100 in FIG. 1. Similar formation evaluation data may be gathered and analyzed during drilling operations (e.g., during logging while drilling operations, and by extension, sampling while drilling).

In some embodiments, the tool body 370 is suspended in the wellbore by a wireline cable 374 that connects the tool to a surface control unit (e.g., comprising a workstation 354). The tool may be deployed in the borehole 312 on coiled tubing, jointed drill pipe, hard wired drill pipe, or any other suitable deployment technique.

Turning now to FIG. 4, it can be seen how a system 464 may also form a portion of a drilling rig 402 located at the surface 404 of a well 406. The drilling rig 402 may provide support for a drill string 408. The drill string 408 may operate to penetrate the rotary table 310 for drilling the borehole 312 through the subsurface formations 314. The drill string 408 may include a Kelly 416, drill pipe 418, and a bottom hole assembly 420, perhaps located at the lower portion of the drill pipe 418.

The bottom hole assembly 420 may include drill collars 422, a down hole tool 424, and a drill bit 426. The drill bit 426 may operate to create the borehole 312 by penetrating the surface 404 and the subsurface formations 314. The down hole tool 424 may comprise any of a number of different types of tools including measurement while drilling tools, logging while drilling tools, and others.

During drilling operations, the drill string 408 (perhaps including the Kelly 416, the drill pipe 418, and the bottom hole assembly 420) may be rotated by the rotary table 310. Although not shown, in addition to, or alternatively, the bottom hole assembly 420 may also be rotated by a motor (e.g., a mud motor) that is located down hole. The drill collars 422 may be used to add weight to the drill bit 426. The drill collars 422 may also operate to stiffen the bottom hole assembly 420, allowing the bottom hole assembly 420 to transfer the added weight to the drill bit 426, and in turn, to assist the drill bit 426 in penetrating the surface 404 and subsurface formations 314.

During drilling operations, a mud pump 432 may pump drilling fluid (sometimes known by those of ordinary skill in the art as "drilling mud") from a mud pit 434 through a hose 436 into the drill pipe 418 and down to the drill bit 426. The drilling fluid can flow out from the drill bit 426 and be returned to the surface 404 through an annular area between the drill pipe 418 and the sides of the borehole 312. The drilling fluid may then be returned to the mud pit 434, where such fluid is filtered. In some embodiments, the drilling fluid can be used to cool the drill bit 426, as well as to provide lubrication for the drill bit 426 during drilling operations. Additionally, the drilling fluid may be used to remove subsurface formation cuttings created by operating the drill bit 426.

Thus, referring now to FIGS. 1 and 3-4, it may be seen that in some embodiments, the systems 364, 464 may include a drill collar 422, a down hole tool 424, and/or a wireline logging tool body 370 to house one or more apparatus 102, similar to or identical to the apparatus 102 described above and illustrated in FIG. 1. Any and all components of the system 100 in FIG. 1 may also be housed by the tool 424 or the tool body 370.

Thus, for the purposes of this document, the term "housing" may include any one or more of a drill collar 422, a down hole tool 424, or a wireline logging tool body 370 (all having an outer surface, to enclose or attach to magnetometers, sensors, fluid sampling devices, pressure measurement devices, temperature measurement devices, transmitters, receivers, acquisition and processing logic, processors, and data acquisition systems). The tool 424 may comprise a down hole tool, such as a logging while drilling (LWD) tool or a measurement while drilling (MWD) tool. The wireline tool body 370 may comprise a wireline logging tool, including a probe or sonde, for example, coupled to a logging cable 374. Many embodiments may thus be realized.

For example, in some embodiments, a system 364, 464 may include a display 396 to present configuration information derived from the binary configuration file BCF, perhaps in graphic form.

The systems 100, 364, 464; apparatus 102; housing 104; data acquisition system 124; processors 130; data structure 134; surface computer 138; logic 140; transceiver 144; additional components 146; memory 150; surface logging facility 156; data 170; displays 196, 396; rotary table 310; borehole 312; computer workstations 354; wireline logging tool body 370; logging cable 374; drilling platform 386; derrick 388; hoist 390; logging facility 392; drill string 408; Kelly 416; drill pipe 418; bottom hole assembly 420; drill collars 422; down hole tool 424; drill bit 426; mud pump 432; mud pit 434; hose 436; and sensors S may all be characterized as "modules" herein.

Such modules may include hardware circuitry, and/or a processor and/or memory circuits, software program modules and objects, and/or firmware, and combinations thereof, as desired by the architect of the apparatus 102 and systems 100, 364, 464, and as appropriate for particular implementations of various embodiments. For example, in some embodiments, such modules may be included in an apparatus and/or system operation simulation package, such as a software electrical signal simulation package, a power usage and distribution simulation package, a power/heat dissipation simulation package, and/or a combination of software and hardware used to simulate the operation of various potential embodiments.

It should also be understood that the apparatus and systems of various embodiments can be used in applications other than for logging operations, and thus, various embodiments are not to be so limited. The illustrations of apparatus 102 and systems 100, 364, 464 are intended to provide a general understanding of the structure of various embodiments, and they are not intended to serve as a complete description of all the elements and features of apparatus and systems that might make use of the structures described herein.

Applications that may include the novel apparatus and systems of various embodiments include electronic circuitry used in high-speed computers, communication and signal processing circuitry, modems, processor modules, embedded processors, data switches, and application-specific modules. Such apparatus and systems may further be included as sub-components within a variety of electronic systems, such as televisions, cellular telephones, personal computers, workstations, radios, video players, vehicles, signal processing for geothermal tools and smart transducer interface node telemetry systems, among others. Some embodiments include a number of methods.

Figure 5:
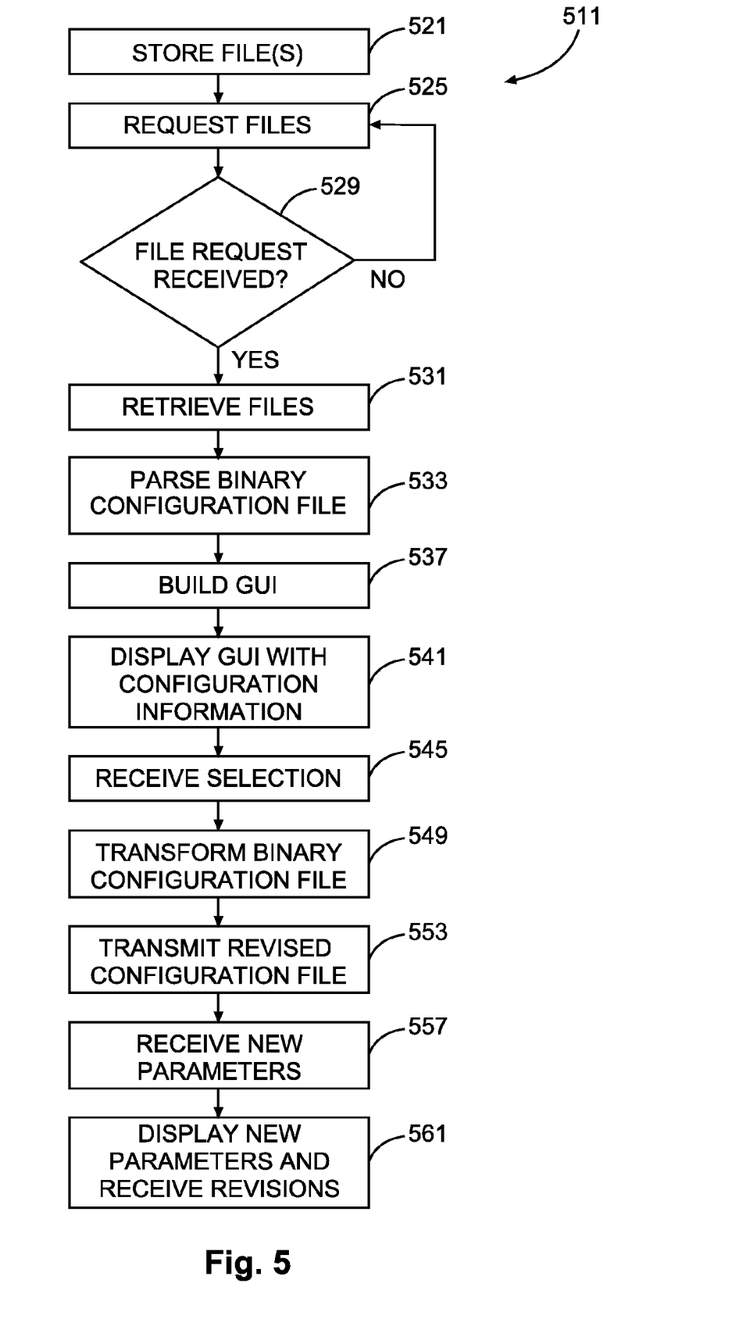
FIG. 5 is a flow chart illustrating several additional methods according to various embodiments of the invention.

For example, FIG. 5 is a flow chart illustrating several additional methods 511 according to various embodiments of the invention. The methods 511 may comprise processor-implemented methods, to execute on one or more processors that perform the methods.

For example, in some embodiments, a method 511 comprises retrieving a binary configuration file and parsing instructions file at block 531, parsing the binary configuration file at block 533, displaying a GUI with configuration information in the form of changeable parameters (extracted from the binary configuration file) at block 541, receiving selections as changes to the configuration information at block 545, transforming the binary configuration file to include the changes at block 549, and sending the revised configuration file back to the housing for storage and access at block 553.

In some embodiments, the binary configuration file is stored in a serialized format. Other storage formats, including compressed formats, can be used. Thus, a method 511 may include, at block 521, storing the binary configuration file in a serialized format. The activity at block 521 may further include storing the parsing instructions file.

To retrieve stored files from the housing, a request for transmission may be initiated by the surface computer. Thus, at block 525, to initiate the activity of retrieving the files, transmission of the parsing instructions file and the binary configuration file may be requested from the housing, which in turn may be configured as a down hole tool or a wireline tool, or in other ways.

Once the request for the files has been received by the housing, as determined at block 529, the method 511 may continue on to block 531, with retrieving a parsing instructions file and/or a binary configuration file stored in the housing.

The method 511 may continue on to block 533, to include parsing the binary configuration file according to the parsing instructions file to determine configuration information associated with the binary configuration file.

Binary configuration files stored in a serialized format can be de-serialized as part of the act of parsing. Thus, the activity at block 533 may comprise de-serializing the binary configuration file.

As noted previously, the parsing instructions can be used by the surface computer to understand the binary configuration file without requiring an upgrade to the software of the surface computer, so that in effect, the surface computer learns the language of the binary configuration file using the parsing instructions. This mode of operation can serve to obviate the need to synchronize surface and down hole software upgrades.

In some embodiments, de-serialized information from the binary configuration file can be used to create an in-memory object at the surface computer and/or the down hole computer. The binary configuration file can thus be used to share the in-memory object between the surface computer and the down hole computer. Therefore, the activity at block 533 may comprise creating an in-memory object from de-serialized configuration information extracted from the binary configuration file.

The parsing instructions file may be used to guide the extraction of values currently assigned to the parameters in the configuration information (e.g., to be displayed within the GUI). Thus, the activity at block 533 may comprise extracting the values of the selection (provided by the operator) from the binary configuration file according to the parsing instructions.

In some embodiments, the GUI format can be determined by the parsing instructions file content. Thus, the GUI may be built, at run time, based on the information contained in the parsing instructions file. Therefore, the method 511 may comprise, at block 537, building the GUI according to display formatting information included in the parsing instructions file.

The GUI can display a variety of parameters with respect to the configuration information, including range limits, increments, and specific acceptable values. Other parameters may include the types of information, arrays of values, and custom data structures. Thus, the activity at block 537 may comprise building the GUI to enable the display of range limits stored in the binary configuration file and associated with the configuration information. The method 511 may thus continue on to block 541 to include displaying at least some of the configuration information as part of a GUI.

As noted previously during the description of various system elements, the GUI can be used to enable the use of new parameters that are associated with new components that have been subsequently attached to the housing (e.g., after installation of the initial version of the binary configuration file). The new components, or a processor within the housing that senses the presence of the new components, may be configured to send an indication to the surface computer that these new parameters should be incorporated into the present set of configuration information. Manual data entry, which triggers an indication at the surface computer, may also suffice to indicate that new components have been added to the housing. Thus, the activity at block 541 may comprise displaying the GUI to enable receiving an indication regarding added components attached to the housing that are not yet associated with displayable portions of the configuration information, to enable display of new parameters associated with the added components.

Parameter values extracted from the binary configuration file may be displayed as default (e.g., highlighted as original, unchanged) parameter values within the GUI. Thus, the activity at block 541 may comprise displaying the values as default values within the GUI. In some embodiments, the method 511 may continue on to block 545 to include receiving a selection of at least some of the configuration information, and corresponding changed parameter values of the configuration information, wherein the selection forms a subset of the configuration information.

The method 511 may continue on to block 549 to include transforming the binary configuration file into a transformed version of the binary configuration file (e.g., as a revised configuration file RCF) to replace values of the selection with the changed parameter values.

Once a revised version of the configuration information is received, perhaps by an operator manipulating a user input device to provide changed parameter values to the GUI, the changed parameter values can be serialized as part of transforming the binary configuration file into the transformed version of the binary configuration file. Thus, the activity at block 549 may comprise serializing configuration information, including the changed parameter values, to form the transformed version of the binary configuration file.

The method 511 may continue on to block 553 with transmitting the transformed version of the binary configuration file to the housing as a replacement for the binary configuration file.

The new parameters can thus become part of the configuration information, after they are made part of the binary configuration file. That is, once the new parameters are incorporated into the binary configuration file, they become an integral part of the tool configuration information. Therefore, the method 511 may continue on to block 557 to include, after the transmitting activity at block 553, receiving the new parameters embedded in the transformed version of the binary configuration file.

Once new parameters become part of the configuration information, they too can be received for display, selection, and revision, in the same way as any other parameters forming part of the original configuration information. Thus, the method 511 may comprise, at block 561, displaying the new parameters within a GUI, and accepting revisions to the new parameters by the GUI.

It should be noted that the methods described herein do not have to be executed in the order described, or in any particular order. Moreover, various activities described with respect to the methods identified herein can be executed in iterative, serial, or parallel fashion. The various elements of each method (e.g., the methods shown in FIGS. 2 and 5) can be substituted, one for another, within and between methods. Information, including parameters, commands, operands, and other data, can be sent and received in the form of one or more carrier waves.

Upon reading and comprehending the content of this disclosure, one of ordinary skill in the art will understand the manner in which a software program can be launched from a computer-readable medium in a computer-based system to execute the functions defined in the software program. One of ordinary skill in the art will further understand the various programming languages that may be employed to create one or more software programs designed to implement and perform the methods disclosed herein. For example, the programs may be structured in an object-orientated format using an object-oriented language such as Java or C#. In another example, the programs can be structured in a procedure-orientated format using a procedural language, such as assembly or C. The software components may communicate using any of a number of mechanisms well known to those skilled in the art, such as application program interfaces or interprocess communication techniques, including remote procedure calls. The teachings of various embodiments are not limited to any particular programming language or environment. Thus, other embodiments may be realized.

Figure 6:
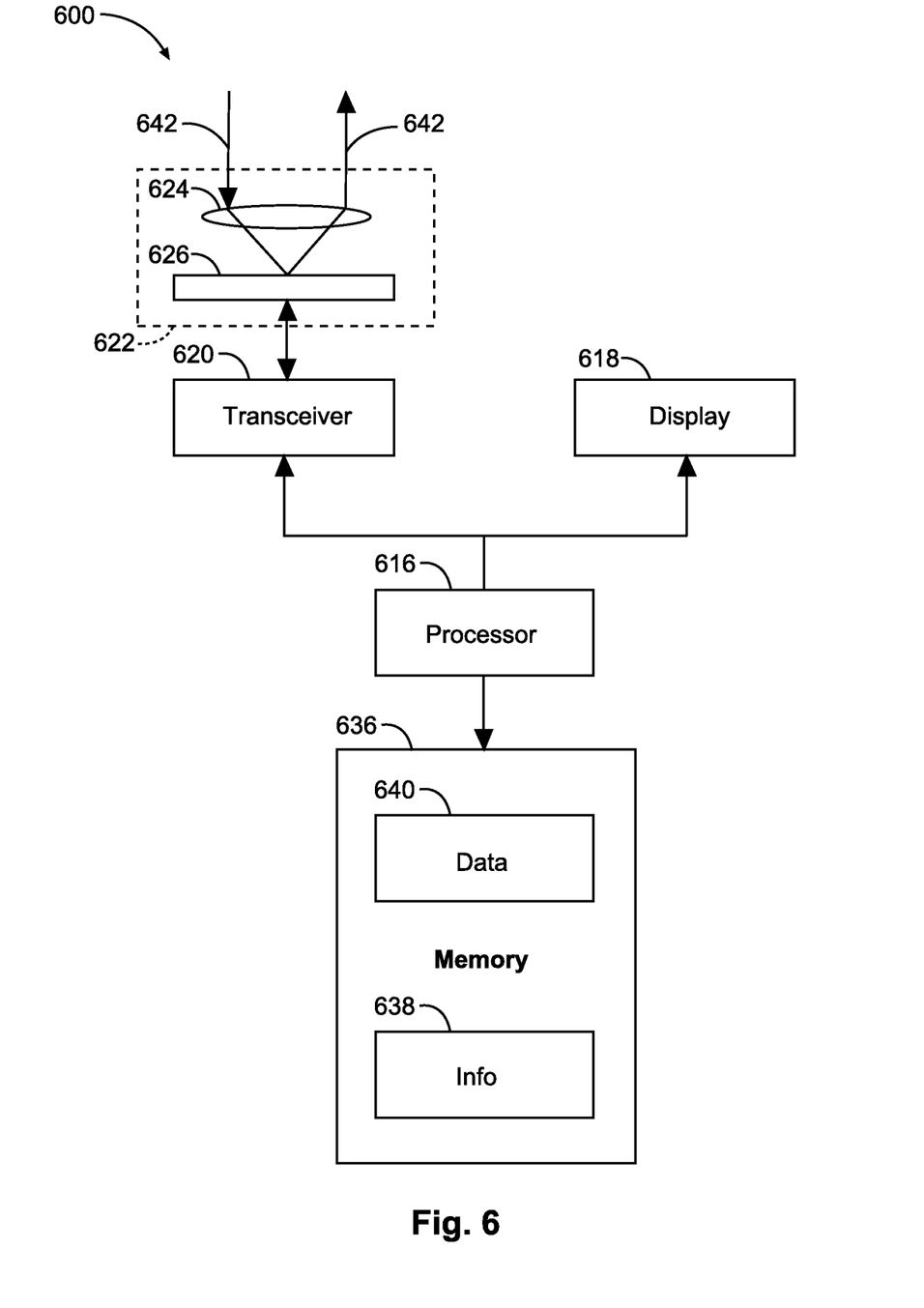
FIG. 6 is a block diagram of an article according to various embodiments of the invention.

For example, FIG. 6 is a block diagram of an article 600 of manufacture according to various embodiments, such as a computer, a memory system, a magnetic or optical disk, or some other storage device. The article 600 may include one or more processors 616 coupled to a machine-accessible medium such as a memory 636 (e.g., removable storage media, as well as any tangible, non-transitory memory) including an electrical, optical, or electromagnetic conductor having associated information 638 (e.g., computer program instructions and/or data), which when executed by one or more of the processors 616, results in a machine (e.g., the article 600) performing any of the actions described with respect to the methods of FIGS. 2 and 5, and the systems of FIGS. 1, 3, and 4. The processors 616 may comprise one or more processors sold by Intel Corporation (e.g., Intel® Core™ processor family), Advanced Micro Devices (e.g., AMD Athlon™ processors), and other semiconductor manufacturers.

In some embodiments, the article 600 may comprise one or more processors 616 coupled to a display 618 to display data processed by the processor 616 and/or a wireless transceiver 620 (e.g., a down hole telemetry transceiver) to receive and transmit data processed by the processor 616.

The memory system(s) included in the article 600 may include memory 636 comprising volatile memory (e.g., dynamic random access memory) and/or non-volatile memory. The memory 636 may be used to store data 640 processed by the processor 616, including corrected compressional wave velocity data that is associated with a first (e.g., target) well, where no measured shear wave velocity data is available.

In various embodiments, the article 600 may comprise communication apparatus 622, which may in turn include amplifiers 626 (e.g., preamplifiers or power amplifiers) and one or more transducers 624 (e.g., transmitting and/or receiving devices, such as acoustic transducers). Signals 642 received or transmitted by the communication apparatus 622 may be processed according to the methods described herein.

Many variations of the article 600 are possible. For example, in some embodiments, the article 600 may comprise a down hole tool, including any one or more elements of the system 100 shown in FIG. 1.

In summary, the apparatus, systems, and methods disclosed herein can accommodate significant changes to the firmware of an embedded device, without giving rise to the release of a corresponding new version of the surface software. As a result, release schedules may proceed independently, speeding up the delivery of new firmware to devices in the field. This capability may serve to enhance the value of services provided by an operation/exploration company, conserving time and expense when tool configurations are changed.

The accompanying drawings that form a part hereof, show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

The Abstract of the Disclosure is provided to comply with 37 C.F.R. § 1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment.

What is claimed is:

1. A system for reconfiguration, comprising:
  a housing comprising a down hole tool or a wireline tool, the housing to store a parsing instructions file and a binary configuration file; and
  a surface computer to parse the binary configuration file according to the parsing instructions file to determine configuration information associated with the binary configuration file,
  to display at least some of the configuration information as part of a graphical user interface (GUI),
  to receive a selection of the at least some of the configuration information and corresponding changed values, the selection forming a subset of the configuration information,
  to transform the binary configuration file into a transformed version of the binary configuration file to replace values of the selection with the changed values, and
  to transmit the transformed version of the binary configuration file to the housing as a replacement for the binary configuration file, the transformed version of the binary configuration file to be used to configure operation of the down hole tool or the wireline tool, wherein the parsing instructions file contains display formatting information, and wherein the GUI is built according to the display information included in the parsing instructions file.

2. The system of claim 1, further comprising:
a sensor attached to the housing, the sensor to be controlled by a processor in the housing according to the selection and the changed values.

3. The system of claim 1, further comprising:
a transmitter to transmit the parsing instructions file from the housing to the surface computer.

4. The system of claim 1, further comprising:
an additional component attached to the housing, the additional component configured so that when operational power is applied to the housing, the additional component is associated with an indication sent to the surface computer that additional parameters associated with the additional component are to be added to the configuration information.

5. The system of claim 1, wherein the parsing instructions file is stored in a self-defining data format.

6. The system of claim 1, further comprising:
a non-volatile memory disposed within the housing, the memory to store the binary configuration file.

7. A processor-implemented method for reconfiguration, to execute on one or more processors that perform the method, comprising:
retrieving a parsing instructions file and a binary configuration file stored in a housing;
parsing the binary configuration file according to the parsing instructions file to determine configuration information associated with the binary configuration file;
displaying at least some of the configuration information as part of a graphical user interface (GUI);
receiving a selection of the at least some of the configuration information and corresponding changed parameter values of the configuration information, the selection forming a subset of the configuration information;
transforming the binary configuration file into a transformed version of the binary configuration file to replace values of the selection with the changed parameter values;
transmitting the transformed version of the binary configuration file to the housing as a replacement for the binary configuration file, and
building the GUI according to display formatting information included in the parsing instructions file.

8. The method of claim 7, wherein the building comprises:
building the GUI to enable display of range limits stored in the binary configuration file and associated with the configuration information.

9. The method of claim 7, wherein the displaying comprises:
displaying the GUI to enable receiving an indication regarding added components attached to the housing that are not yet associated with displayable portions of the configuration information, to enable display of new parameters associated with the added components.

10. The method of claim 9, further comprising:
after the transmitting, receiving the new parameters embedded in the transformed version of the binary configuration file.

11. The method of claim 10, further comprising:
displaying the new parameters within the GUI; and
accepting revisions to the new parameters by the GUI.

12. The method of claim 7, further comprising:
storing the binary configuration file in a serialized format.

13. The method of claim 7, wherein the parsing comprises:
deserializing the binary configuration file.

14. The method of claim 7, wherein the parsing comprises:
creating an in-memory object from deserialized configuration information extracted from the binary configuration file.

15. The method of claim 7, wherein the transforming comprises:
serializing configuration information, including the changed parameter values, to form the transformed version of the binary configuration file.

16. An article for reconfiguration including a non-transitory machine-accessible medium having instructions stored therein, wherein the instructions, when accessed, result in a machine performing:
retrieving a parsing instructions file and a binary configuration file stored in a housing;
parsing the binary configuration file according to the parsing instructions file to determine configuration information associated with the binary configuration file;
displaying at least some of the configuration information as part of a graphical user interface (GUI);
receiving a selection of the at least some of the configuration information and corresponding changed parameter values of the configuration information, the selection forming a subset of the configuration information;
transforming the binary configuration file into a transformed version of the binary configuration file to replace values of the selection with the changed parameter values;
transmitting the transformed version of the binary configuration file to the housing as a replacement for the binary configuration file; and
building the GUI according to display formatting information included in the parsing instructions file.

17. The article of claim 16, wherein the instructions, when accessed, result in the machine performing:
extracting the values of the selection from the binary configuration file according to the parsing instructions.

18. The article of claim 17, wherein the instructions, when accessed, result in the machine performing:
displaying the values as default values within the GUI.

19. The article of claim 16, wherein the instructions, when accessed, result in the machine performing:
as part of the retrieving, requesting transmission of the parsing instructions file and the binary configuration file from the housing configured as a down hole tool.

* * * * *